US009547110B2

(12) United States Patent
Wang

(10) Patent No.: US 9,547,110 B2
(45) Date of Patent: Jan. 17, 2017

(54) COLOR FILTER SUBSTRATE AND METHOD OF MANUFACTURING THE SAME, DISPLAY APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventor: Dong Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/528,571

(22) Filed: Oct. 30, 2014

(65) Prior Publication Data
US 2015/0378071 A1 Dec. 31, 2015

(30) Foreign Application Priority Data
Jun. 30, 2014 (CN) .......................... 2014 1 0306806

(51) Int. Cl.
G02B 5/20 (2006.01)
G02F 1/1335 (2006.01)
(52) U.S. Cl.
CPC ......... *G02B 5/201* (2013.01); *G02F 1/133514* (2013.01); *G02F 1/133516* (2013.01)
(58) Field of Classification Search
None
See application file for complete search history.

(56) References Cited

U.S. PATENT DOCUMENTS

| 8,395,154 | B2* | 3/2013 | Kamata | ............... G03F 7/70633 |
| | | | | 257/57 |
| 2007/0064188 | A1* | 3/2007 | Okamoto | .............. G02F 1/1333 |
| | | | | 349/135 |
| 2010/0320468 | A1 | 12/2010 | Kamata et al. | |
| 2012/0229740 | A1* | 9/2012 | Tsai | .................. G02F 1/133514 |
| | | | | 349/106 |

FOREIGN PATENT DOCUMENTS

| CN | 1885116 A | 12/2006 |
| CN | 101344662 A | 1/2009 |
| CN | 102681240 A | 9/2012 |
| CN | 102681251 A | 9/2012 |

OTHER PUBLICATIONS

First Chinese Office Action dated May 24, 2016, for corresponding Chinese Application No. 201410306806.3.
Second Chinese Office Action dated Oct. 28, 2016, for corresponding Chinese Application No. 201410306806.3.

* cited by examiner

*Primary Examiner* — Darryl J Collins
*Assistant Examiner* — Journey Sumlar
(74) *Attorney, Agent, or Firm* — Kinney & Lange, P.A.

(57) ABSTRACT

The present invention discloses a color filter substrate comprising a substrate; and a color filter layer disposed on the substrate. The color filter layer comprises at least two color regions, and at least two alignment marks, corresponding to the at least two color regions respectively, disposed on a perimeter zone of the substrate. Each of the alignment marks is configured to have a block structure, and at least one of the alignment marks is provided with a recess in a top thereof.

5 Claims, 2 Drawing Sheets

COLOR FILTER SUBSTRATE AND METHOD OF MANUFACTURING THE SAME, DISPLAY APPARATUS

CROSS-REFERENCE TO RELATED APPLICATION

This application claims the benefit of Chinese Patent Application No. 201410306806.3 filed on Jun. 30, 2014 in the State Intellectual Property Office of China, the whole disclosure of which is incorporated herein by reference.

BACKGROUND OF THE INVENTION

Field of the Invention

The embodiments of the present invention relate to a display technology field, more particularly, relate to a color filter substrate, a method of manufacturing the same, and a display apparatus.

Description of the Related Art

A color filter substrate is one of the main structures of a liquid crystal display. Generally, the color filter substrate comprises a substrate and a color filter layer on the substrate. The color filter layer comprises a red region, a green region and a blue region. In order to precisely form the red region, the green region and the blue region on corresponding positions of the substrate, three identical cuboid alignment marks, corresponding to the red region, the green region and the blue region respectively, are disposed on a perimeter zone of the substrate.

Hereafter, it will describe a method of manufacturing the color filter layer on the substrate on which the alignment marks are provided in a case where the red region, the green region and the blue region are successively formed. The method of manufacturing the color filter layer comprises steps of: firstly, coating a red resin layer on the substrate to cover the whole substrate; secondly, detecting the gray tone on the perimeter zone of the substrate by an exposure machine, since an area where the alignment mark is located is thicker than other area of the substrate, the area where the alignment mark is located has a gray tone significantly different from that of the other area of the substrate, thereby the alignment mark is identified and aligned to a respective alignment mark on a mask; thirdly, exposing and developing the red resin layer to form a red region; and similarly, thereafter, successively forming the green region and the blue region on the substrate. In this way, the entire color filter layer is formed.

In order that the red region, the green region and the blue region formed on the substrate have the same thickness, amounts of the red resin, the green resin and the blue resin coated on the substrate are gradually reduced.

In the above method of manufacturing the color filter layer, during coating the resin (the red resin, the green resin and the blue resin are all referred to as the resin herein) on the substrate, since the resin has fluidity and viscosity, the resin coated on the alignment mark may flow to other positions on the substrate, it causes the thickness of resin on the top of the alignment mark uneven. Generally, the less the amount of the resin is coated, the more resin flows to the other positions, and the more uneven the resin on the top of the alignment mark becomes, causing the thickness of the area where the alignment mark is located become more uneven. Since the gray tone of the alignment mark is determined by the thickness of the area where the alignment mark is located, the gray tone of the alignment mark is not uniform if the thickness of the area where the alignment mark is located is not even. As a result, it may cause that the alignment mark cannot be identified by the exposure machine.

SUMMARY OF THE INVENTION

The present invention has been made to overcome or alleviate at least one aspect of the above mentioned disadvantages.

According to an object of the present invention, there is provided a color filter substrate and a method of manufacturing the same, a display apparatus, wherein a resin on a top of an alignment mark becomes more even than the prior art.

According to an aspect of the present invention, there is provided a color filter substrate comprising:

a substrate; and a color filter layer disposed on the substrate, the color filter layer comprising:

at least two color regions; and at least two alignment marks, corresponding to the at least two color regions respectively, disposed on a perimeter zone of the substrate, wherein each of the alignment marks is configured to have a block structure, and at least one of the alignment marks is provided with a recess in a top thereof.

In an exemplary embodiment of the present invention, the recess is configured to have an inverted trapezoid cross section.

According to another aspect of the present invention, there is provided a display apparatus comprising the above mentioned color filter substrate.

According to another aspect of the present invention, there is provided a method of manufacturing a color filter substrate, comprising steps of:

forming at least two alignment marks on a perimeter zone of a substrate, wherein each of the alignment marks is configured to have a block structure, and at least one of the alignment marks is provided with a recess in a top thereof; and forming a color filter layer on the substrate, wherein the color filter layer comprises at least two color regions, and the at least two alignment marks correspond to the at least two color regions respectively.

BRIEF DESCRIPTION OF THE DRAWINGS

The above and other features of the present invention will become more apparent by describing in detail exemplary embodiments thereof with reference to the accompanying drawings, in which.

REFERENCE LIST

Figure 1:
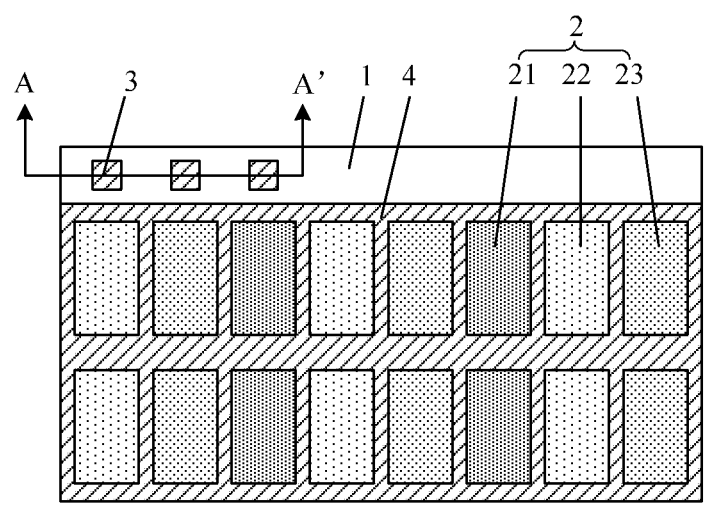
FIG. 1 is an illustrative plan view of a color filter substrate according to an exemplary embodiment of the present invention.

| 1—substrate; | 2—color filter layer; | 21—red region; |
|---|---|---|
| 22—green region; | 23—blue region; | 3—alignment mark; |
| 4—black matrix; | 5—multi gray tone mask; | 51—transparent area; |
| 52—translucent area; | 53—variable transmission area. | |

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a color filter substrate comprising a substrate; and a color filter layer disposed on the substrate. The color filter layer comprises at least two color regions, and at least two alignment marks, corresponding to the at least two color regions respectively, disposed on a perimeter zone of the substrate. Each of the alignment marks is configured to have a block structure, and at least one of the alignment marks is provided with a recess in a top thereof.

In a color filter substrate according to an exemplary embodiment of the present invention, a resin on a top of an alignment mark becomes even and flat.

Figure 2:
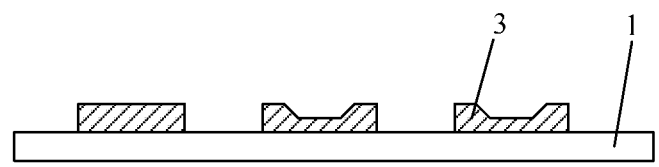
FIG. 2 is an illustrative cross section view of the color filter substrate taken in a line A-A' of FIG. 1.

In an exemplary embodiment, as shown in FIG. 1, the color filter substrate comprises a substrate 1 and a color filter layer 2 on the substrate 1. The color filter layer 2 comprises at least two different color regions. The color filter substrate further comprises at least two alignment marks 3 disposed on a perimeter zone of the substrate 1. The alignment marks 3 correspond to the different color regions, respectively. In an embodiment, as shown in FIG. 2, each of the alignment marks 3 is configured to have a block structure, and at least one of the alignment marks 3 is provided with a recess in a top thereof. As an example, the recess may be configured to have an inverted trapezoid cross section. The alignment mark 3 may have a length and width both equal to 100 μm. The shape of the recess is not limited to the illustrated embodiment. For example, the recess may have any other suitable shape as long as such shaped recess can form a high resistance against flow of the resin material.

Figure 3:
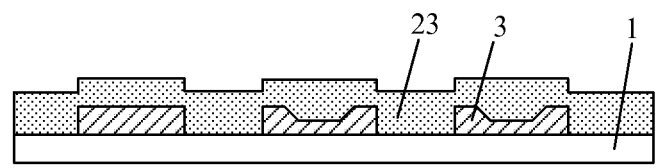
FIG. 3 is an illustrative cross section view of a color filter substrate on which a resin is coated according to an exemplary embodiment of the present invention.

As shown in FIG. 3, after a resin material for forming the different color regions of the color filter layer 2 is coated on the respective alignment marks 3 having the recesses, the recesses hinder the flow of the resin material, ensuring that the resin material on the top of the alignment mark 3 becomes even and flat, an area where the alignment mark 3 is located has an even thickness, the alignment mark 3 has an uniform gray tone, and the alignment mark 3 can be precisely identified by an exposure machine.

Please note that the above expression "at least one of the alignment marks 3 is provided with a recess in a top thereof" may comprise two situations. A first situation is that all alignment marks 3 are provided with recesses in tops thereof. A second situation is that all alignment marks 3 except the alignment mark 3 corresponding to the color region firstly formed in the color filter layer 2 are provided with recesses in tops thereof. Hereafter, it will describe the reason why the alignment mark 3 corresponding to the color region firstly formed may not be provided with a recess. The color filter layer 2 comprises at least two different color regions, for example, a red region, a green region and a blue region. During forming the color filter layer 2, the red region is firstly formed. Since there are a few structures formed on the substrate 1 at the beginning, a large amount of red resin can be coated on the substrate 1. In this way, the red resin on the top of the alignment mark 3 is not likely to flow to other positions on the substrate even if the alignment mark 3 is not provided with a recess in the top thereof. Thereby, the red resin on the top of the alignment mark 3 can keep even and flat, and the thickness of the area where the alignment mark 3 is located can keep uniform.

In an exemplary embodiment, as shown in FIG. 1, the color filter substrate may further comprise a black matrix 4 having a thickness of 1.1~1.2 μm. In order to further save the cost, in a preferable embodiment, the black matrix 4 may be made of a material same as that of the alignment mark 3.

In an exemplary embodiment, as shown in FIG. 1, the color filter layer 2 comprises a red region 21, a green region 22 and a blue region 23. The color filter substrate comprises three alignment marks 3 disposed on the perimeter zone of the substrate 1 and corresponding to the red region 21, the green region 22 and the blue region 23, respectively. Two of the three alignment marks 3 are provided with recesses in the tops thereof.

In an exemplary embodiment, the color filter substrate may further comprise a transparent protection layer on the color filter layer 2 and the black matrix 4, and a pillar spacer on the transparent protection layer. The transparent protection layer is used to flatten the surface of the color filter substrate and isolate the color filter layer 2 and the black matrix 4 from liquid crystal molecules. The pillar spacer is used to maintain a thickness of a liquid crystal box formed by assembling the color filter substrate and an array substrate together.

In an exemplary embodiment, the color filter layer 2 may have a thickness of about 1.5 μm. Please note that the thinner the thickness of the color filter layer 2 is, and the less the amount of the resin material to form the color filter layer 2 is, the more superiority the color filter substrate of the embodiments of the present invention has.

In an exemplary embodiment of the present invention, there is provided a color filter substrate comprising a substrate and a color filter layer disposed on the substrate. The color filter layer comprises at least two color regions. The color filter substrate further comprises at least two alignment marks disposed on the perimeter zone of the substrate. The at least two alignment marks correspond to the at least two color regions respectively. Each of the alignment marks is configured to have a block structure, and at least one of the alignment marks is provided with a recess in a top thereof. Consequently, after a resin material for forming the different color regions of the color filter layer is coated on the respective alignment marks having the recesses, the recesses hinder the flow of the resin material, ensuring that the resin material on the top of the alignment mark becomes even and flat, an area where the alignment mark is located has an even thickness, the alignment mark has an uniform gray tone, and the alignment mark can be precisely identified by an exposure machine.

In another exemplary embodiment of the present invention, there is also provided a display apparatus comprising a color filter substrate according to any one of the above embodiments. The display apparatus may be any product or member with a display function, such as, a liquid crystal panel, an electronic paper, a liquid crystal TV, a liquid crystal display, a digital photo frame, a mobile telephone, a panel computer, and so on.

Figure 4:
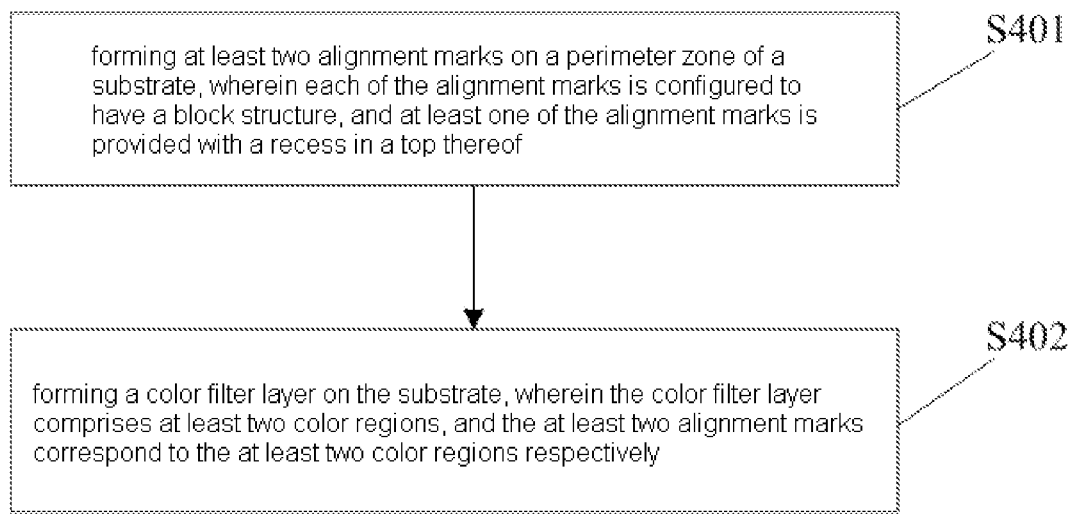
FIG. 4 is an illustrative flow chart of manufacturing a color filter substrate according to an exemplary embodiment of the present invention.

In another exemplary embodiment of the present invention, there is also provided a method of manufacturing a color filter substrate. As shown in FIG. 4, the method of manufacturing a color filter substrate may comprise steps of:

S401: forming at least two alignment marks on a perimeter zone of a substrate, wherein each of the alignment marks is configured to have a block structure, and at least one of the alignment marks is provided with a recess in a top thereof;

As an example, the recesses formed in the tops of the alignment marks 3 may be configured to have an inverted trapezoid cross section.

Figure 5:
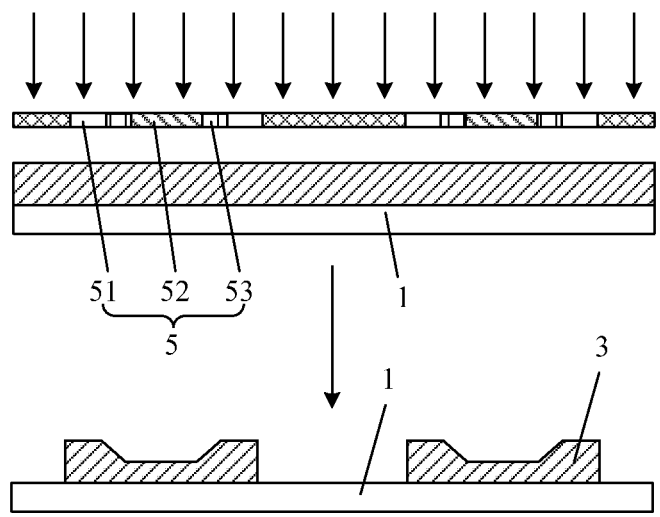
FIG. 5 is an illustrative view of exposing an alignment mark according to an exemplary embodiment of the present invention.

In an exemplary embodiment, there is provided a method of forming the alignment mark 3 with the recess having the inverted trapezoid cross section. As shown in FIG. 5, the method of forming the alignment mark comprises steps of: forming a photo resist layer on the substrate; and exposing the photo resist layer with a multi gray tone mask 5 and developing the exposed photo resist layer, so as to form at least two alignment marks 3. The multi gray tone mask 5 comprises a transparent area 51, a translucent area 52 and a variable transmission area 53 with a minimum transmissivity equal to a transmissivity of the translucent area 52 and a maximum transmissivity equal to a transmissivity of the transparent area 51. The transparent area 51 is used to form an area of the alignment mark 3 except the recess, the translucent area 52 is used to form the bottom of the recess, and the variable transmission area 53 is used to form the sidewalls of the recess. The variable transmission area 53 has a transmissivity increasing in a direction away from the bottom of the recess.

In an exemplary embodiment, in order to save the cost and simplify the process of manufacturing the color filter substrate, the black matrix 4 is formed on the substrate 1 at the same time as forming the at least two alignment marks 3 on the perimeter zone of the substrate 1.

In an exemplary embodiment, the process of forming the alignment marks 3 and the black matrix 4 on the substrate 1 at the same time may comprise steps of: firstly, coating a black resin layer on the substrate 1; secondly, placing the substrate 1 on a base station of an exposure machine and aligning the substrate 1 to the base station; thirdly, aligning a mask to the base station; fourthly, adjusting a gap between the substrate 1 and the mask; and finally, aligning the substrate 1 to the mask, exposing and developing the substrate 1 to form a pattern comprising the alignment marks 3 and the black matrix 4. Before placing the substrate 1 on the base station of the exposure machine, the substrate 1 may be heated by a hot plate to preliminary cure the black resin, then the temperature of the black resin on the substrate 1 may be precisely controlled by a cooling plate.

S402: forming a color filter layer on the substrate, wherein the color filter layer comprises at least two color regions, and the at least two alignment marks correspond to the at least two color regions respectively.

As an example, forming the color filter layer 2 on the substrate may comprise steps of: forming a red region 21 on the substrate 1; forming a green region 22 on the substrate 1; and forming a blue region 23 on the substrate 1. Please note that the sequence of forming the red, green and blue regions is not limited to this, it can be changed by those skilled in the art according to actual requirements.

As an example, hereafter it will describe a method of manufacturing the color filter layer 2 on the substrate in a case where the red region 21, the green region 22 and the blue region 23 are successively formed. Firstly, coating a red resin layer on the substrate 1, placing the substrate 1 on the base station of the exposure machine, aligning the substrate 1 to the base station, and controlling the gap between the substrate and the mask; secondly, identifying the alignment mark corresponding to the red region with the exposure machine, and aligning the identified alignment mark to a respective alignment mark on the mask; finally, exposing and developing the substrate to form the red region 21. Similarly, thereafter, the green region 22 and the blue region 23 can be successively formed on the substrate. In this way, the entire color filter layer is formed.

In an exemplary embodiment, since the color filter layer 2 formed on the substrate 1 comprises the red region 21, the green region 22 and the blue region 23, three alignment marks 3 are formed in the step of S401. The three alignment marks 3 correspond to the red region 21, the green region 22 and the blue region 23, respectively. As it can be known from the method of forming the recess having an inverted trapezoid cross section in the step of S401, it needs to use the multi gray tone mask 5 during making the alignment marks 3 provided with recesses in tops thereof. Since the variable transmission area 53 on the multi gray tone mask 5 is expensive to produce, in an exemplary embodiment, it is preferable that only two alignment masks 3 are provided with recesses in tops thereof as long as the resin material on the tops of the alignment marks 3 can be kept even and flat.

In an exemplary embodiment of the present invention, there is provided a method of manufacturing a color filter substrate, comprising: forming at least two alignment marks on a perimeter zone of a substrate, wherein each of the alignment marks is configured to have a block structure, and at least one of the alignment marks is provided with a recess in a top thereof; and forming a color filter layer comprising at least two different color regions on the substrate. In this way, after a resin material for forming the different color regions of the color filter layer is coated on the respective alignment marks having the recesses, the recesses hinder the flow of the resin material, ensuring that the resin material on the top of the alignment mark becomes even and flat, an area where the alignment mark is located has an even thickness, the alignment mark has an uniform gray tone, and the alignment mark can be precisely identified by an exposure machine.

It should be appreciated by those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A method of manufacturing a color filter substrate, comprising steps of:
    forming at least two alignment marks on a perimeter zone of a substrate, wherein each of the alignment marks is configured to have a block structure, and at least one of the alignment marks is provided with a recess in a top thereof; and
    forming a color filter layer on the substrate, wherein the color filter layer comprises at least two color regions, and the at least two alignment marks correspond to the at least two color regions respectively;
    wherein said forming at least two alignment marks on a perimeter zone of a substrate comprising:
        forming a photo resist layer on the substrate; and
        exposing the photo resist layer with a multi gray tone mask and developing the exposed photo resist layer, so as to form at least two alignment marks,
        wherein the multi gray tone mask comprises a transparent area, a translucent area and a variable transmission area with a minimum transmissivity equal to a transmissivity of the translucent area and a maximum transmissivity equal to a transmissivity of the transparent area,
    wherein the transparent area is used to form an area of the alignment mark except the recess, the translucent area is used to form the bottom of the recess, and the variable transmission area is used to form the sidewalls of the recess,
    wherein the variable transmission area has a transmissivity increasing in a direction away from the bottom of the recess.

2. The method according to claim 1, wherein the recess is configured to have an inverted trapezoid cross section.

3. The method according to claim 1, wherein said forming at least two alignment marks on a perimeter zone of a substrate comprising:
    forming a black matrix on the substrate at the same time as forming the at least two alignment marks on the perimeter zone of the substrate.

4. The method according to claim 1,
    wherein said forming at least two alignment marks on a perimeter zone of a substrate comprising:
        forming three alignment marks on the substrate;
    wherein said forming a color filter layer on the substrate comprising:
    forming a red region on the substrate;
    forming a green region on the substrate;
    forming a blue region on the substrate;
    wherein the three alignment marks correspond to the red region, the green region and the blue region, respectively.

5. The method according to claim 4,
    wherein one of the red region, the green region and the blue region is firstly formed on the substrate, and
    wherein two alignment marks corresponding to two other regions formed later each is provided with the recess in the top thereof.

\* \* \* \* \*